United States Patent
Sakama

(10) Patent No.: US 8,410,938 B2
(45) Date of Patent: Apr. 2, 2013

(54) RFID TAG LOCATED ON METALLIC SURFACES THAT HAVE AN INCREASED COMMUNICATION RANGE

(75) Inventor: Isao Sakama, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 587 days.

(21) Appl. No.: 12/043,595

(22) Filed: Mar. 6, 2008

(65) Prior Publication Data
US 2008/0252462 A1     Oct. 16, 2008

(30) Foreign Application Priority Data
Apr. 11, 2007   (JP) .................................. 2007-103791

(51) Int. Cl.
*G08B 13/14*     (2006.01)
(52) U.S. Cl. ................. 340/572.7; 340/10.1; 340/572.1; 340/572.8; 343/700 MS
(58) Field of Classification Search .............. 340/572.7
See application file for complete search history.

(56) References Cited

U.S. PATENT DOCUMENTS

| | | | |
|---|---|---|---|
| 5,699,319 A * | 12/1997 | Skrivervik | 368/10 |
| 5,771,002 A * | 6/1998 | Creek et al. | 340/539.21 |
| 6,281,794 B1 * | 8/2001 | Duan et al. | 340/572.1 |
| 7,196,626 B2 * | 3/2007 | Chen et al. | 340/572.7 |
| 2004/0046699 A1 * | 3/2004 | Amano et al. | 343/702 |
| 2005/0280504 A1 * | 12/2005 | Pettus | 340/10.1 |
| 2006/0244606 A1 * | 11/2006 | Li et al. | 340/572.7 |
| 2006/0267843 A1 * | 11/2006 | Sakama et al. | 343/700 MS |
| 2007/0035458 A1 * | 2/2007 | Ohba | 343/702 |
| 2007/0046466 A1 * | 3/2007 | Sakama et al. | 340/572.1 |
| 2007/0046475 A1 * | 3/2007 | Carrender | 340/572.7 |
| 2007/0279231 A1 * | 12/2007 | Cheng et al. | 340/572.7 |
| 2008/0035741 A1 | 2/2008 | Sakama | |
| 2008/0157976 A1 * | 7/2008 | God et al. | 340/572.7 |

FOREIGN PATENT DOCUMENTS

| | | |
|---|---|---|
| EP | 1538560 | 6/2005 |
| EP | 1605397 | 12/2005 |
| EP | 1758050 | 2/2007 |
| FR | 2844075 | 3/2004 |
| JP | 2005-309811 | 11/2005 |

* cited by examiner

*Primary Examiner* — Benjamin C Lee
*Assistant Examiner* — Curtis King
(74) *Attorney, Agent, or Firm* — Mattingly & Malur, PC

(57) ABSTRACT

An RFID tag includes a first antenna on which an IC chip is mounted and a second antenna extending from an end of the first antenna in a direction at right angles to the first antenna. The first antenna has an arbitrarily electrical length and the second antenna has an electrical length of $\lambda/2$ or an integral multiple of $\lambda/2$. A resin base film having a thickness of approximately 50 μm is disposed on the back side of the first antenna and the second antenna. With this configuration of a tag antenna, the second antenna resonates with the first antenna to exhibit a radio wave amplifying effect. Therefore, a long communication distance can be achieved even if the electrical length of the first antenna is chosen to be short or the thickness of the base film is chosen to be thin.

15 Claims, 12 Drawing Sheets

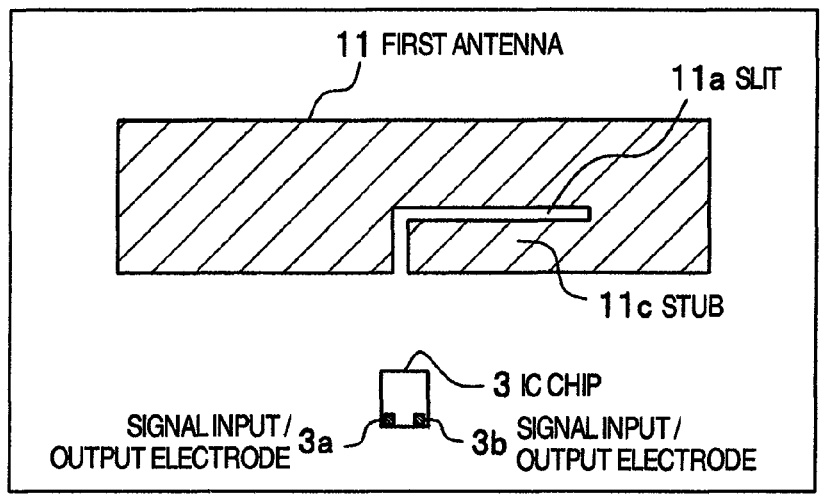
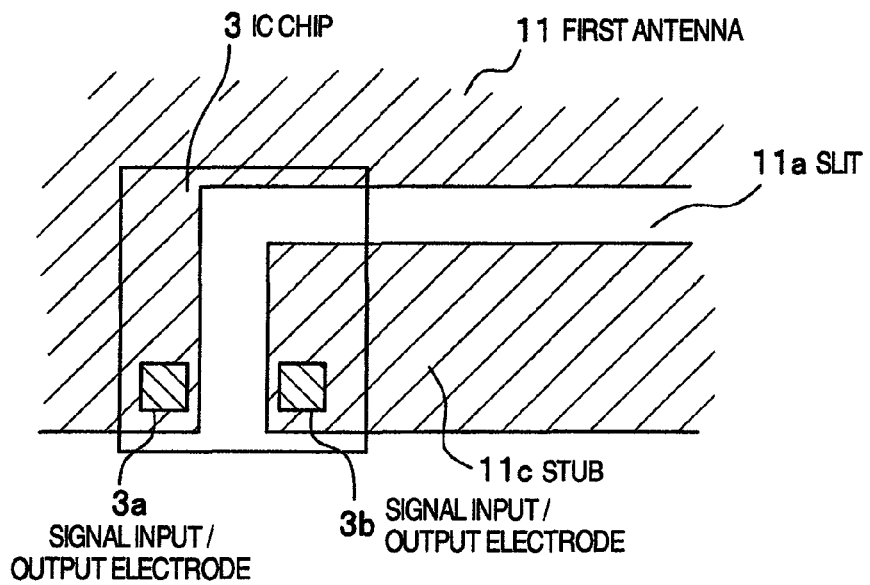
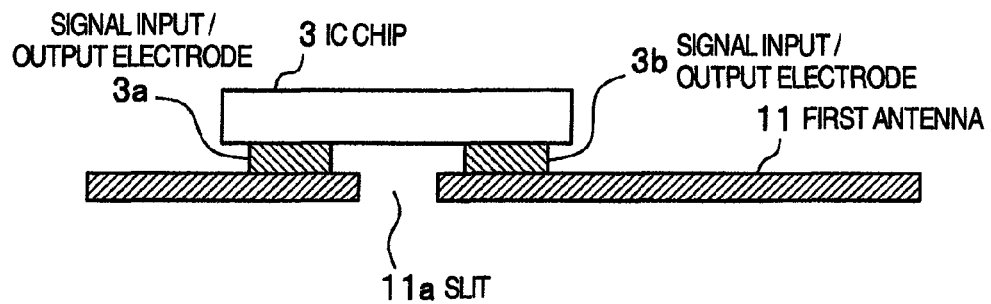

RFID TAG LOCATED ON METALLIC SURFACES THAT HAVE AN INCREASED COMMUNICATION RANGE

INCORPORATION BY REFERENCE

The present application claims priority from Japanese application JP2007-103791 filed on Apr. 11, 2007, the content of which is hereby incorporated by reference into this application.

BACKGROUND OF THE INVENTION

The present invention relates to an RFID (Radio Frequency Identification) tag that transmits information such as ID (Identification) information recorded on an IC chip at an RF (Radio Frequency).

An RFID tag consists of an IC chip and a tag antenna and is capable of transmitting information such as ID recorded on the IC chip through the tag antenna via a radio frequency (RF). Accordingly, by passing the RFID tag near a reader/writer, information recorded on the IC chip can be read in a noncontact manner at a relatively long communication distance (for example approximately 140 mm). Therefore, RFID tags are often used for production management and logistics management of products fabricated at factories. However, the communication distance significantly decreases when the RFID tag is attached directly to the surface of a metal material. To solve the problem, if a half-wave dipole antenna having a total length of a half-wave ($\lambda/2$) is used as the tag antenna of an RFID tag, the RFID tag is attached to the surface of a metal material through a spacer made of an insulator having a thickness of approximately 1 mm or more to attain a desired communication distance. Another technique has been disclosed in which a relatively thick (for example 1 mm or more thick) insulator such as a resin having a low dielectric constant or soft magnetic material is placed between the tag antenna and the attaching surface of a metal material, thereby reducing the influence of the metal material on the tag antenna to prevent reduction of the communication distance (see JP-A-2005-309811, paragraphs 0023 through 0029 and FIGS. 1 and 2, for example).

SUMMARY OF THE INVENTION

However, while a desired communication distance can be attained by placing an insulator or a soft magnetic material having a predetermined thickness (for example a thickness of 1 mm or more) between the tag antenna and the attaching surface of a metal material, the entire RFID tag becomes thicker, which makes the RFID tag likely to fall off the surface of the metal material. Furthermore, in the case of the technique disclosed in the related art given above, the resonance point of the tag antenna can vary depending on whether the RFID tag is attached to the surface of an object made of a metal material or an object made of a nonmetal material due to the layered structure of the tag antenna and the soft magnetic material. That is, since changes in the electric potential on a metal surface are small, the electric potential distribution of the tag antenna can change and therefore the resonance point can change. When the RFID tag is attached to a nonmetal object with a soft magnetic material between them, a change of the resonance point of the tag antenna (first tag antenna) can reduce the communication distance.

The present invention has been made in light of the problems described above and an object of the present invention is to provide an RFID tag capable of reducing variations in communication distance even when the resonance point of a first antenna changes.

To achieve the object, an RFID tag according to the present invention is an RFID tag transmitting information recorded on an IC chip by radio, including: a first antenna including the IC chip mounted in a central part in a longitudinal direction; and a second antenna connected to one end of the first antenna; wherein the second antenna has an electrical length of an integral multiple of $\lambda/2$ in a longitudinal direction, where $\lambda$ is a wavelength of a radio wave emitted from the first antenna.

With this RFID tag, since the second antenna connected to one end of the first antenna has an electrical length of an integral multiple of $\lambda/2$, the second antenna resonates through the first antenna regardless of the length of the first antenna. Consequently, variations in the communication distance due to changes of the resonance point of the first antenna are reduced. In particular, the influence of the plane of polarization of a receiving antenna is reduced when the first and second antennas are electrically connected or electrostatically coupled with each other at an angle of approximately 90 degrees, because the planes of polarization of electromagnetic waves emitted from the first and second antennas are approximately orthogonal to each other. This also reduces changes in the communication distance. In particular, even if the surface of a metal is close to the tag antenna with a spacer between them, a desired communication distance can be achieved. Changes in resonance frequency are small even when the RFID tag is attached to a metal material with a spacer made from a resin film, rather than a soft magnetic material, disposed on the back side.

In the RFID tag according to the present invention, the second antenna resonates through the first antenna. Therefore, variations in the communication distance can be reduced even when the resonance point of the first antenna changes. In particular, variations in the communication distance can be reduced even when the back side of the RFID tag is attached to the surface of a metal.

Other objects, features and advantages of the invention will become apparent from the following description of the embodiments of the invention taken in conjunction with the accompanying drawings.

BRIEF DESCRIPTION OF THE DRAWINGS

FIGS. 4A, 4B, and 4C are process diagrams showing a process for mounting an IC chip on a power supply portion of a first antenna 11, where FIG. 4A shows the first antenna and the power supply portion of the IC chip, FIG. 4B is an enlarged view of the power supply portion of the first antenna on which the IC chip is mounted, and FIG. 4C is a cross-sectional view of the junction between the first antenna and the IC chip;

DESCRIPTION OF THE INVENTION

First Embodiment

Figure 1:
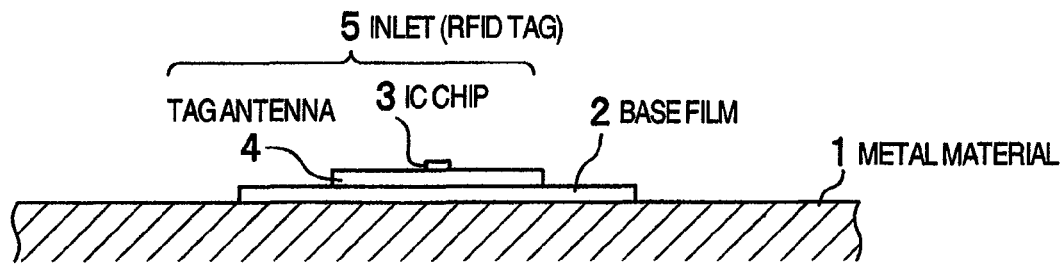
FIG. 1 is a cross-sectional view of an RFID tag of one embodiment of the present invention attached to a surface of a metal material.

Embodiments of an RFID tag according to the present invention will be described below in detail with reference to the accompanying drawings. FIG. 1 is a cross-sectional view of an RFID tag attached to a surface of a metal material. A tag antenna 4 having an IC chip 3 mounted thereon (hereinafter an arrangement including the IC chip 3 and the tag antenna 4 is referred to as an inlet 5 and an arrangement laminated with an outer film or films, not shown, is referred to as an RFID tag) is attached to a surface of a resin base film 2 by an adhesive or the like. The base film 2, which acts as a spacer, is placed between the surface of a metal material 1 and the tag antenna 4. Thus, information recorded on the IC chip 3 can be read and written by a reader/writer (not shown) when the reader/writer is passed near the tag antenna 4.

Figure 2:
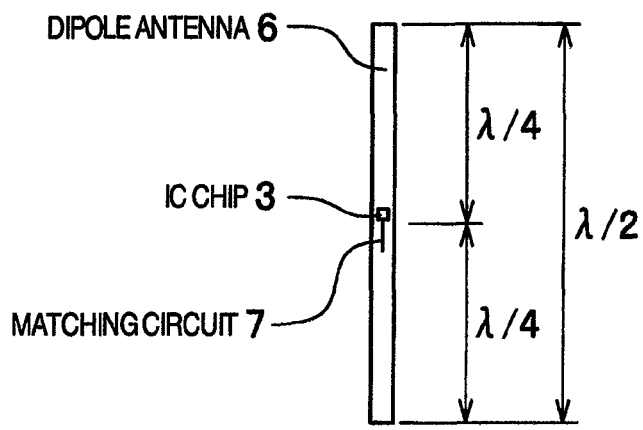
FIG. 2 is a top view of an RFID tag that uses a dipole antenna as the tag antenna 4 shown in FIG. 1.

FIG. 2 is a top view showing an RFID tag that uses a dipole antenna as the tag antenna 4 shown in FIG. 1. The dipole antenna 6 has an electrical length of $\lambda/2$, where $\lambda$ is the wavelength of the radio wave used. A matching circuit 7 is formed at approximately the center of the dipole antenna 6, that is, at the position of $\lambda/4$ and the IC chip 3 is mounted at the location corresponding to $\lambda/4$. The inlet 5 including the dipole antenna 6 and the IC chip 3 is attached to the surface of the metal material 1 with the base film 2 having a thickness of approximately 1 mm or more between them as a spacer. For example, when the frequency of the radio wave used is 2.45 GHz, the physical length of the dipole antenna 6 is approximately 50 mm, if the dielectric constant of the base film 2 is so small that the effect of reduction of wavelength is neglected.

When the dipole antenna 6 having such a length (i.e. approximately 50 mm) is used as the tag antenna 4 shown in FIG. 1, information can be read from and written on the IC chip 3 on the RFID tag attached to a surface of the metal material 1 through the base film 2 having a thickness of 1 mm or more by an off-the-shelf reader/writer at a communication distance of approximately 30 mm. However, with the configuration that uses the dipole antenna 6 as shown in FIG. 2, the RFID tag including the inlet 5 can fall off the metal material 1 because the base film 2 is too thick.

Therefore, according to the following embodiments, a dipole antenna on which an IC chip is mounted is provided as a first antenna (main antenna) and a second antenna (auxiliary antenna) that resonates through the first antenna is provided to implement a tag antenna capable of providing a relatively long communication distance when the RFID tag including the inlet 5 is attached to a surface of a metal material. Several variations of the tag antenna according to the first embodiment of the present invention will be described below.

First Variation of Strip Tag Antenna

Figure 3:
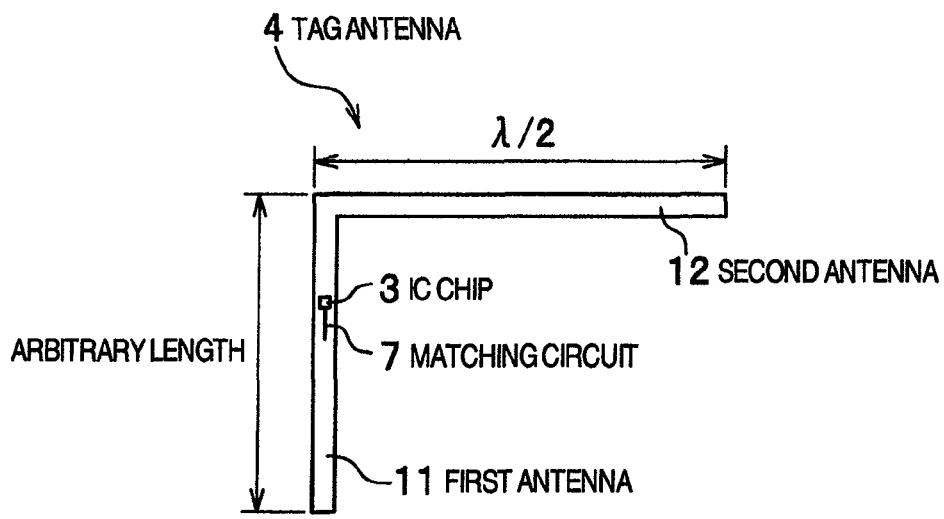
FIG. 3 is a configuration diagram showing a first variation of a strip tag antenna in a first embodiment of the present invention.

In a first variation of a strip tag antenna according to the first embodiment, a dipole antenna having the IC chip 3 mounted thereon is provided as a first antenna and a second antenna that resonates through the first antenna is disposed at right angles to the first antenna so that a desired communication distance can be attained even if the thickness of the base film 2 shown in FIG. 1 is chosen to be thin. FIG. 3 is a configuration diagram of the first variation of the strip tag antenna of the first embodiment. As shown in FIG. 3, a second antenna 12 extends from one end of a first antenna 11, which is a dipole antenna having the IC chip 3 mounted thereon, in a direction at right angles to the first antenna 11. The first antenna 11 has an arbitrary electrical length and the second antenna 12 extending from the end of the first antenna 11 has an electrical length of $\lambda/2$, or $\lambda/2$ multiplied by n, where n is an integer greater than or equal to 1. The dimensions in a width direction of the first and second antennas 11 and 12 may be any values less than or equal to $\lambda/2$. For example, the width may be as narrow as approximately 3 mm.

With the configuration of the tag antenna 4 as shown in FIG. 3, the second antenna 12 resonates through the first antenna 11 and therefore a relatively long communication distance (for example on the order of 30 mm) can be attained even when the electrical length of the first antenna 11 is chosen to be shorter than $\lambda/2$ or the thickness of the base film 2 acting as a spacer for the metal material 1 is chosen to be as thin as the order of 50 μm. Consequently, information can be read from and written to the RFID tag 5 by an off-the-shelf reader/writer at a normal communication distance. The metal material 1 and the tag antenna 4 are insulated from each other by the base film 2 and the metal material 1 forms an equipotential surface.

Furthermore, disposing the two antenna elements implemented by the first and second antennas 11 and 12 at right angles to each other or in another nonlinear manner enables the tag antenna 4 to exhibit the characteristic of elliptical polarization which polarizes waves in two directions. Accordingly, a reader/writer having a linearly polarized antenna, which has a simple structure, can be used without consideration of the plane of polarization of the tag antenna 4. Thus, the read range of the reader/writer is widened. For a reader/writer having a circularly polarized antenna, the communication distance can be further increased because the overlapping area of polarization planes increases and accordingly the efficiency of the radio wave of the tag antenna is improved. In addition, communications can be successfully performed between the reader/writer and the tag antenna 4 regardless of the orientation of the antenna of the reader/writer.

By disposing the second antenna 12 orthogonally to the first antenna 11, the direction of rotation of elliptical polarization can be defined. For example, in the case of the configuration of the tag antenna 4 shown in FIG. 3, the direction of rotation of polarization is clockwise because the second antenna 12 extends from the end of the first antenna 11 to the right. It should be noted that if the length of the first antenna 11 is reduced, the field intensity of the second antenna 12 in the direction of polarization increases and the second antenna 12 will exhibit a characteristic closer to linear polarization. In this case, communication can be performed with a higher field intensity by orienting the antenna of the reader/writer in the direction of the linear polarization of the second antenna 12.

The first and second antennas 11 and 12 shown in FIG. 3 can be formed by disposing a metal foil or the like on the top surface of the base film 2 such as a resin film (for example a polyimide resin film) having a thickness of approximately 50 μm as shown in FIG. 1. Since the thickness of each of the first and second antennas 11 and 12 is several tens of μm, the antenna elements can be formed by applying metal vapor deposition to the top surface of the base film 2. The first and second antennas 11 and 12 may be electrically interconnected by conductor connection or may be electrically interconnected by inserting a dielectric film near the ends of the antennas and overlaying areas near the ends on each other to form a layered structure to electrostatically couple the first and second antennas 11 and 12 with each other. When the first and second antennas 11 and 12 are electrostatically coupled with each other in this way, it is desirable that a film having a high dielectric constant be inserted.

An L-shaped slit is formed in the first antenna 11 and the matching circuit 7 is provided for impedance matching. The IC chip 3 is mounted across the slit. If the electrical length of the first antenna 11 is $\lambda/2$, the matching circuit 7 is provided at approximately the center of the first antenna 11 (that is, approximately the position of $\lambda/4$). If the electrical length of the first antenna 11 is shorter than $\lambda/2$, the matching circuit 7 and the IC chip 3 are shifted toward the position at which the first and the second antennas 11 and 12 are interconnected.

Here, a specific example will be described in detail in which a slit for impedance matching is provided in the first antenna 11 and the IC chip 3 is mounted. FIGS. 4A to 4C are process diagrams showing a process for mounting the IC chip 3 on a power supply portion of the first antenna 11. FIG. 4A shows the first antenna 11 and the power supply portion of the IC chip 3, FIG. 4B shows an enlarged view of the power supply portion after the IC chip 3 is mounted on the first antenna 11, and FIG. 4C is a cross-sectional view of the junction between the first antenna 11 and the IC chip 3.

As shown in FIG. 4A, an L-shaped slit 11a is formed in the power supply portion of the first antenna 11 for impedance matching between the IC chip 3 and the first antenna 11. The portion surrounded by the L-shaped slit 11a is formed as a stub 11c. Signal input/output electrodes 3a, 3b are formed on the IC chip 3, spaced across the slit 11a.

Since the width of the slit 11a is slightly smaller than the distance between the signal input/output electrodes 3a and 3b of the IC chip 3, the signal input/output electrodes 3a and 3b are connected to the first antenna 11 in such a manner that they are disposed across the slit 11a when the IC chip 3 is mounted on the first antenna 11 as shown in FIG. 4B. By connecting the stub 11c thus provided by the formation of the slit 11a in series between the first antenna 11 and the IC chip 3, the stub 11c functions as an inductance component connected in series between the first antenna 11 and the IC chip 3. Accordingly, the inductance component matches the input and output impedances of the first antenna 11 and the IC chip 3. That is, the slit 11a and the stub 11c shown in FIG. 4 form the matching circuit 7 as shown in FIG. 2. As shown in FIG. 4C, the signal input/output electrodes 3a and 3b of the IC chip 3 are electrically joined to the first antenna 11 through metal bumps by using a bonding method such as ultrasonic bonding or metal eutectic bonding.

Figure 5:
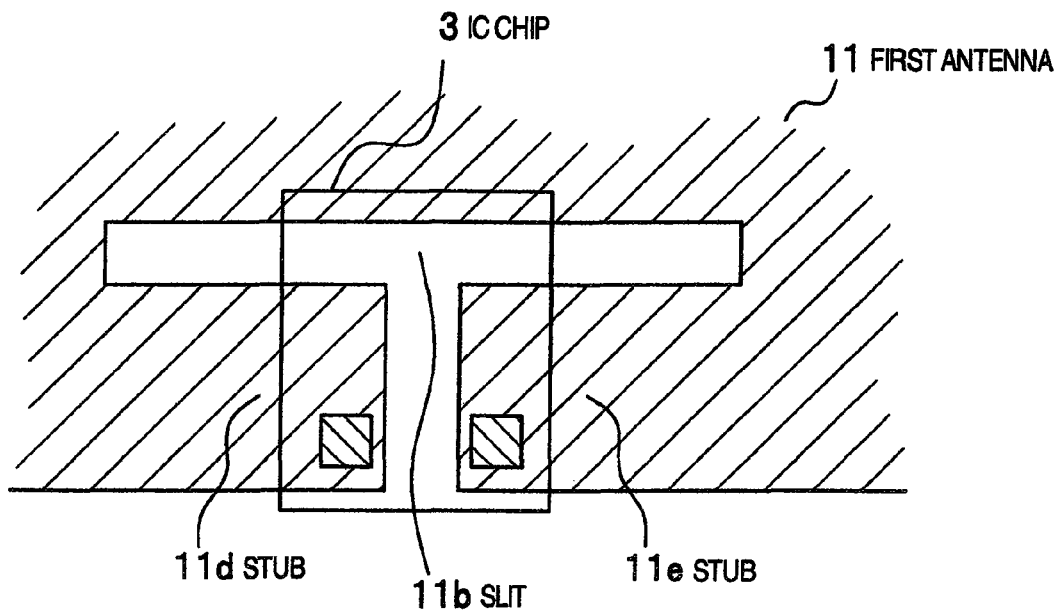
FIG. 5 is a conceptual diagram showing the first antenna 11 in which an IC chip is mounted on the power supply portion of a T-shaped slit.

The slit formed in the first antenna 11 may be T-shaped instead of L-shaped. FIG. 5 is a conceptual diagram showing the first antenna 11 in which the IC chip 3 is mounted on a power supply portion of a T-shaped slit 11b. Impedance matching between the first antenna 11 and the IC chip 3 can also be achieved by forming the slit lib of the first antenna 11 into a T-shape and connecting stubs 11d and 11e in series between the IC chip 3 and the first antenna 11 as shown in FIG. 5, as with the L-shaped slit 11a.

Second Variation of Strip Tag Antenna

Figure 6:
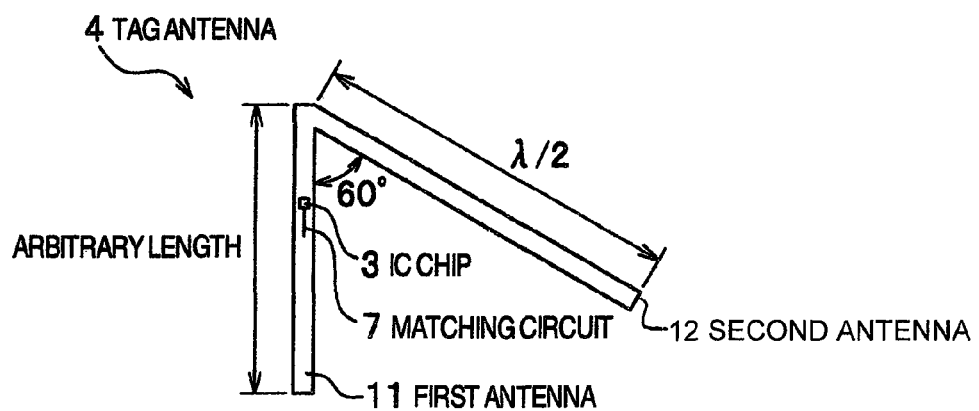
FIG. 6 is a configuration diagram showing a second variation of the strip tag antenna according to the first embodiment of the present invention.

FIG. 6 is a configuration diagram of a second variation of the strip tag antenna according to the first embodiment of the present invention. The angle formed by the first antenna 11 with the second antenna 12 is not limited to 90 degrees; the angle may be any value less than or equal to 90 degrees. For example, the angle formed by the first antenna 11 with the second antenna 12 may be 60 degrees as shown in FIG. 6. Again, the first antenna 11 has an arbitrary electrical length and the electrical length from the end of the first antenna 11 to the end of the second antenna 12 (that is, the electrical length of the second antenna 12) is λ/2 or λ/2 multiplied by n (where n is an integer greater than or equal to 1).

In the tag antenna 4 having the shape as shown in FIG. 6, the second antenna 12 resonates through the first antenna 11 and therefore a relatively long communication distance can be attained even if the electrical length of the first antenna 11 is chosen to be shorter than λ/2 or the thickness of the base film 2 acting as a spacer for the metal material 1 is chosen to be as thin as the order of 50 μm. The tag antenna 4 in the shape as shown in FIG. 6 can emit an electromagnetic wave having two different planes of polarization (namely an elliptically-polarized electromagnetic wave). Consequently, the need for considering the polarization planes of the tag antenna 4 is lessened even if a reader/writer has a linearly polarized antenna.

Third Variation of Strip Tag Antenna

Figure 7A:
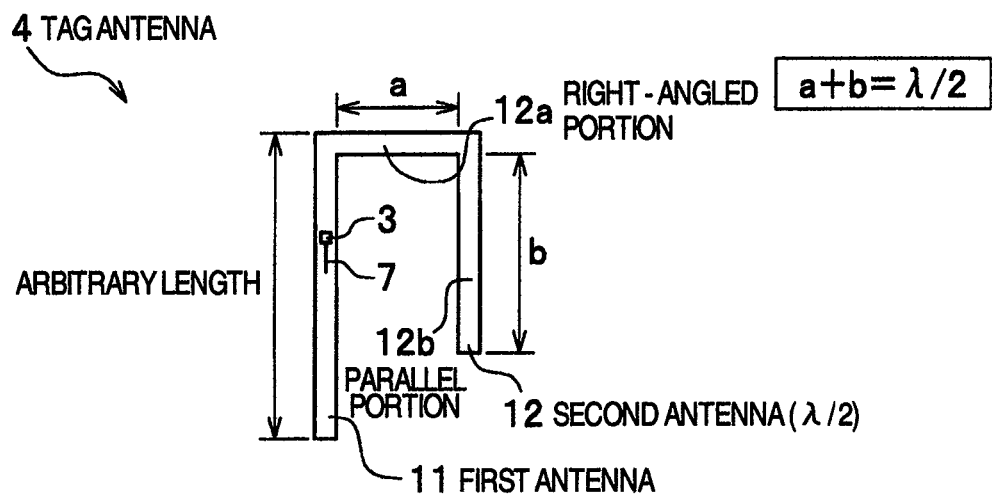
FIGS. 7A and 7B are configuration diagrams showing a third variation of the strip tag antenna according to the first embodiment of the present invention.
Figure 7B:
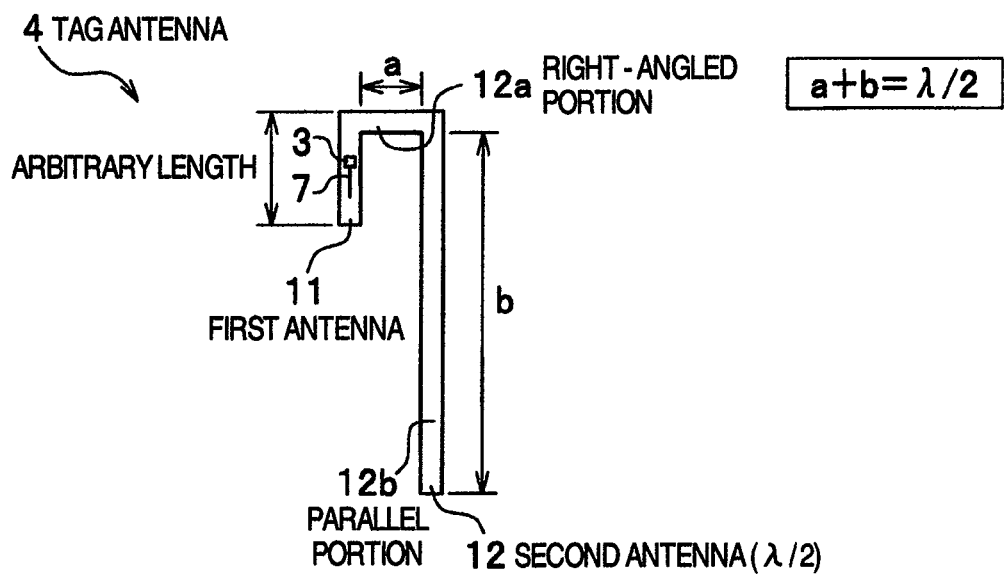

FIGS. 7A and 7B are configuration diagrams of a third variation of the strip tag antenna according to the first embodiment. As shown in FIG. 7A, the first antenna 11 has an arbitrary electrical length and a right-angled portion 12a of the second antenna 12 extends from an end of the first antenna 11 by a length "a" in a direction at right angles to the first antenna 11 and then is bent at a right angle in the direction parallel to the first antenna 11. A parallel portion 12b of the second antenna 12 extends from the end of the right-angled portion 12a by a length "b". While the total electrical length of the right-angled portion 12a and the parallel portion 12b of the second antenna 12 (that is, the length (a+b)) is λ/2 or λ/2 multiplied by n (where n is an integer greater than or equal to 1), the electrical length "b" of the parallel portion 12b of the second antenna 12 is shorter than the electrical length of the first antenna 11.

The shape of the tag antenna shown in FIG. 7B is basically the same as the shape in FIG. 7A. The total electrical length of the right-angled portion 12a and the parallel portion 12b of the second antenna 12 (that is, the length (a+b)) is λ/2 or λ/2 multiplied by n (where n is an integer greater than or equal to 1), but in the case of FIG. 7B, the electrical length "b" of the parallel portion 12b of the second antenna 12 is longer than the electrical length of the first antenna 11.

In the tag antenna 4 having the shape as shown in either of FIGS. 7A and 7B, the second antenna 12 resonates with the first antenna 11 and therefore a relatively long communication distance can be attained even if the electrical length of the first antenna 11 is chosen to be shorter than λ/2 or the thickness of the spacer 2 is chosen to be as thin as the order of 50 μm. Furthermore, by forming a tag antenna into such a shape, the projected area of the entire RFID tag can be made smaller than that of a tag antenna having either of the shapes shown in FIGS. 3 and 6. That is, the area occupied by the RFID tag can be reduced.

Furthermore, by forming a tag antenna into the shape as shown in FIG. 7B, the length of the parallel portion 12b of the second antenna 12 is increased and therefore the tag antenna is capable of exhibiting the characteristic of linear polarization. In addition, by forming a tag antenna into the shape as shown in FIG. 7B, the width of the entire RFID tag can be made smaller as compared with conventional RFID tags.

Fourth Variation of Strip Tag Antenna

Figure 8A:
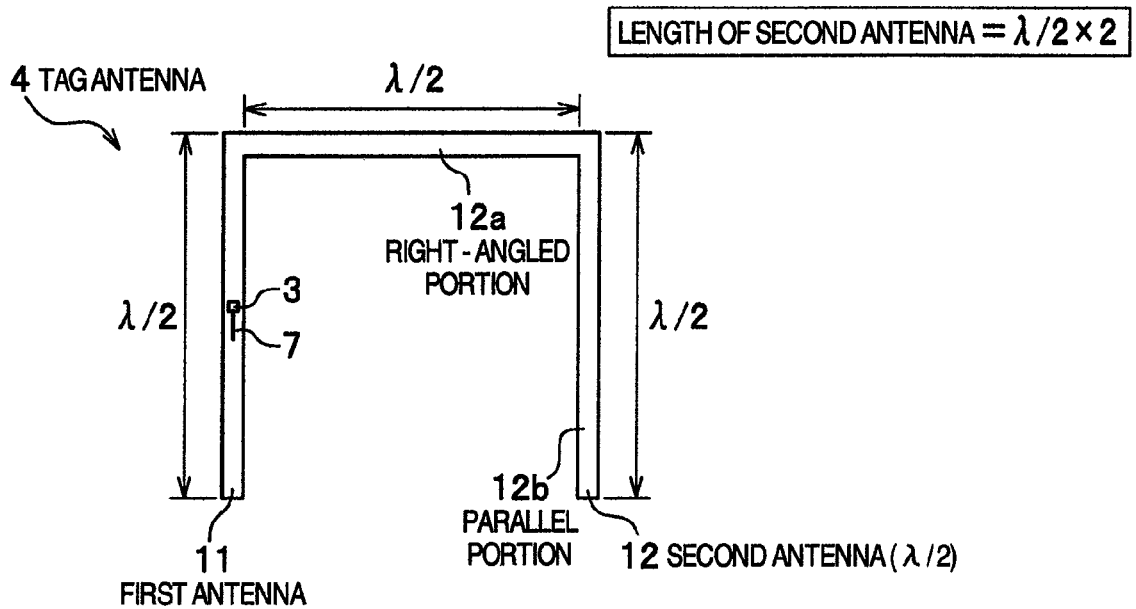
FIGS. 8A and 8B are configuration diagrams showing a fourth variation of the strip tag antenna according to the first embodiment of the present invention.
Figure 8B:
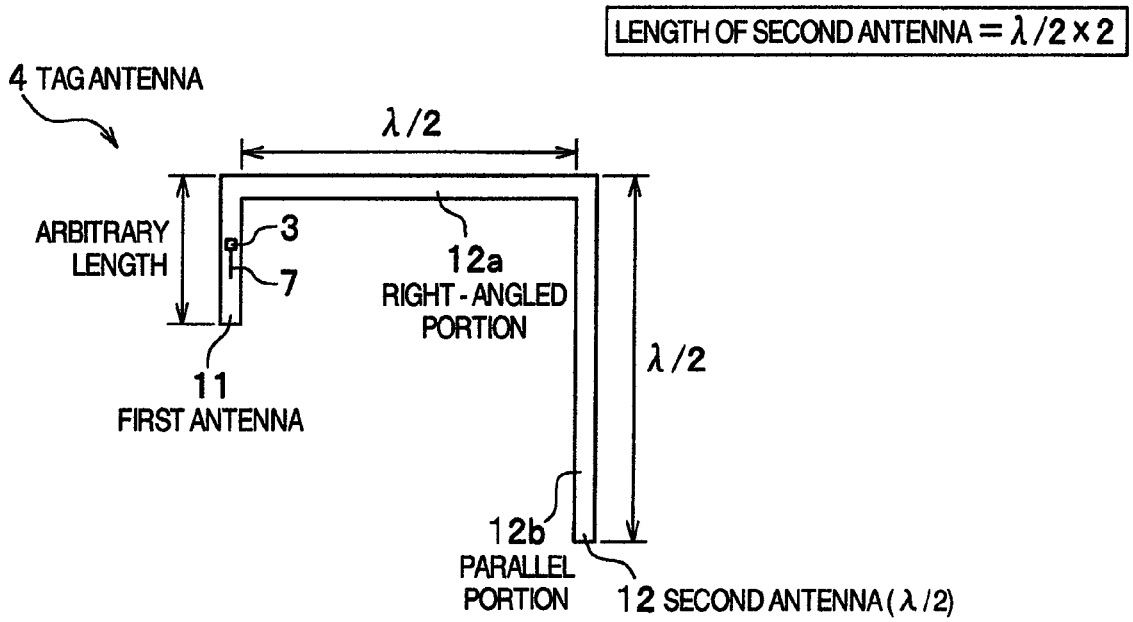

FIGS. 8A and 8B are configuration diagrams of a fourth variation of the strip tag antenna according to the first embodiment. In the tag antenna 4 shown in FIG. 8A, the first antenna 11 has an electrical length of λ/2, the right-angled portion 12a of the second antenna 12 extends from an end of the first antenna 11 by an electrical length of λ/2 and is bent at a right angle in the direction parallel to the first antenna 11. The parallel portion 12b of the second antenna 12 extends by an electrical length of λ/2. That is, the electrical length of the second antenna 12 is (λ/2)×2 and the parallel portion 12b of the second antenna 12 parallel to the first antenna 11 has the same length as that of the first antenna 11.

The tag antenna 4 shown in FIG. 8B has a shape basically identical to that in FIG. 8A. Only the difference from the tag antenna 4 shown in FIG. 8A is that the first antenna 11 in FIG. 8B has an arbitrary electrical length. The parallel portion 12b of the second antenna 12 that has an electrical length of λ/2 is longer than the first antenna 11. The electrical length of the second antenna 12 is again (λ/2)×2.

In the tag antenna 4 having the shape as shown in either of FIGS. 8A and 8B, the right-angled portion 12a of the second antenna 12 resonates with the electric potential at the end of the first antenna 11 and the parallel portion 12b of the second antenna 12 resonates with the electric potential at the end of the right-angled portion 12a and therefore a relatively long communication distance can be achieved. Furthermore, the tag antenna 4 of this large size can further extend the read range.

Fifth Variation of Strip Tag Antenna

Figure 9:
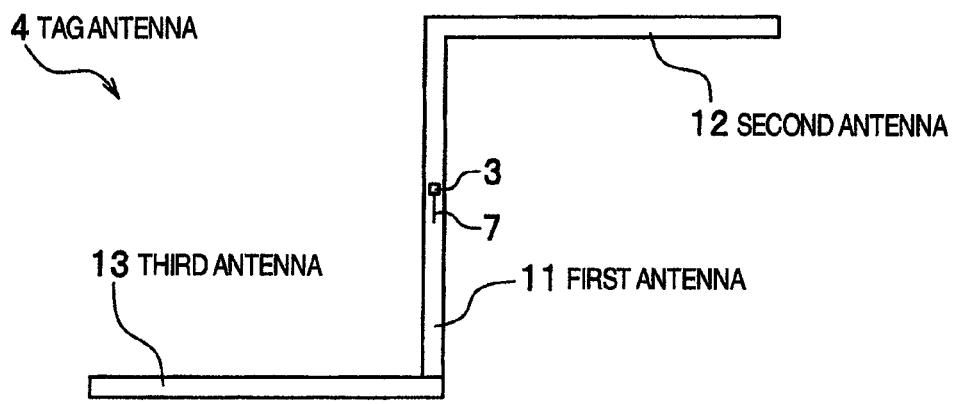
FIG. 9 is a configuration diagram showing a fifth variation of the strip tag antenna according to the first embodiment of the present invention.

FIG. 9 is a configuration diagram of a fifth variation of the strip tag antenna according to the first embodiment. As shown in FIG. 9, the second antenna 12 extends from one end of the first antenna 11 having the IC chip 3 mounted thereon and having an arbitrary length in a direction at right angles to the first antenna 11 by an electrical length of λ/2. A third antenna 13 extends from the other end of the first antenna 11 in the direction opposite to the second antenna 12 at right angles to the first antenna 11 by an electrical length of λ/2. By forming the tag antenna 4 having the second antenna 12 and the third antenna 13 that extend in opposite directions at right angles to the first antenna 11, the read range can be further increased.

Sixth Variation of Strip Tag Antenna

Figure 10:
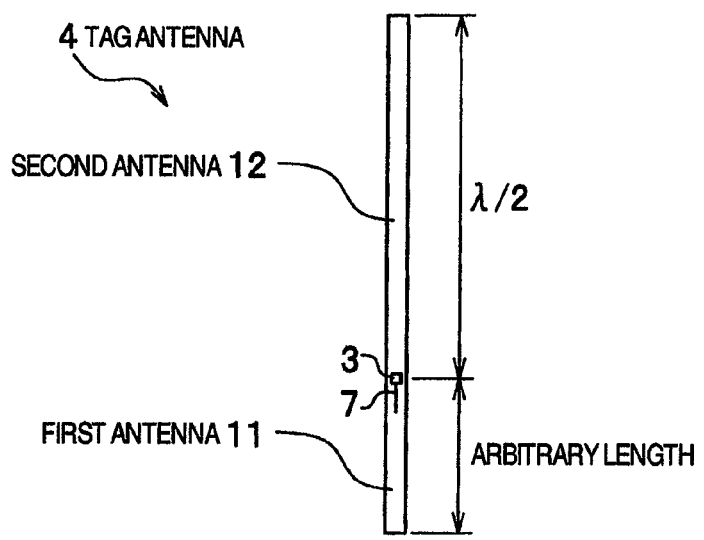
FIG. 10 is a configuration diagram showing a sixth variation of the strip tag antenna according to the first embodiment of the present invention.

FIG. 10 is a configuration diagram of a sixth variation of the strip tag antenna according to the first embodiment. As shown in FIG. 10, the second antenna 12 extends from one end of the first antenna 11 having the IC chip 3 mounted thereon and an arbitrary length in the same direction as the first antenna 11 by an electrical length of λ/2. The first antenna 11 and the second antenna 12 resonate and the tag antenna 4 including the first and second antennas 11 and 12 can exhibit the characteristic of a linear polarization.

Seventh Variation of Strip Tag Antenna

Figure 11:
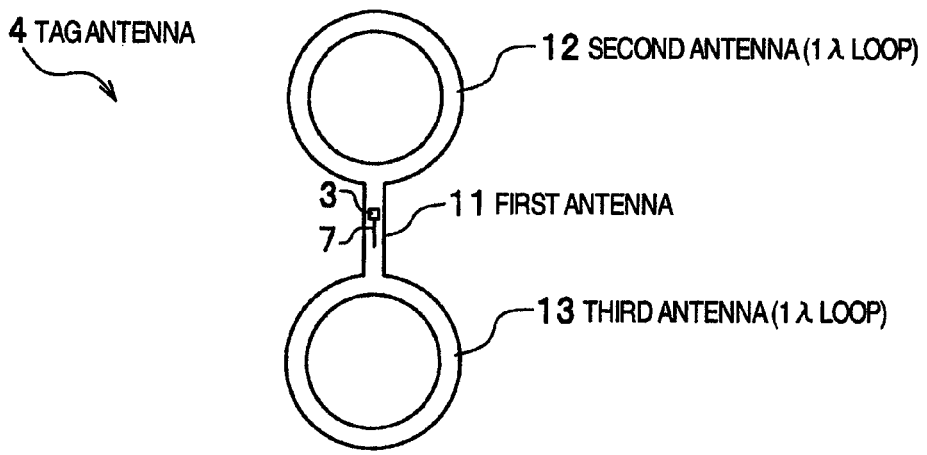
FIG. 11 is a configuration diagram showing a seventh variation of the strip tag antenna according to the first embodiment of the present invention.

FIG. 11 is a configuration diagram of a seventh variation of the strip tag antenna according to the first embodiment. As shown in FIG. 11, the second antenna 12 and the third antenna 13, each having an electrical length of λ, are formed into loops at the ends of the first antenna 11 having the IC chip 3 mounted thereon and an arbitrary length. The loops of the second and third antennas 12 and 13 form magnetic antennas. The first antenna 11 allows the second antenna 12 and the third antenna 13 to resonate with each other and therefore the communication distance of the tag antenna 4 can be increased.

Second Embodiment

Several variations of the strip tag antenna have been described in the first embodiment. Several variations of a wide tag antenna having a wide second antenna will be described in a second embodiment.

First Variation of Wide Tag Antenna

Figure 12:
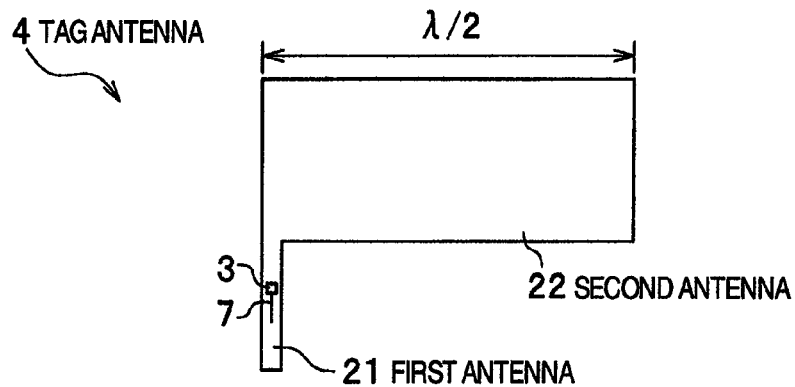
FIG. 12 is a configuration diagram showing a first variation of a wide tag antenna according to a second embodiment of the present invention.

FIG. 12 is a configuration diagram of a first variation of a wide tag antenna according to the second embodiment. In this variation, the configuration of the first variation of the first embodiment shown in FIG. 3 is modified to increase the width of the second antenna. That is, as shown in FIG. 12, a longer side of a rectangular second antenna 22 wider than a first antenna 21 having an IC chip 3 mounted thereon is connected to an end of the first antenna 21. The second antenna 22 extends in a direction at right angles to the first antenna 21. The first antenna 21 has an arbitrary length. The wide second antenna 22 extending from the end of the first antenna 21 at right angles has an electrical length of $\lambda/2$ or $\lambda/2$ multiplied by n (where n is an integer greater than or equal to 1). The width of the second antenna 22 is a value less than or equal to $\lambda/2$.

The configuration of the tag antenna 4 as shown in FIG. 12 allows the second antenna 22 to resonate regardless of the length of the first antenna 21. Therefore, a relatively long communication distance of the tag antenna 4 can be attained even if the electrical length of the first antenna 21 is chosen to be less than $\lambda/2$ or the thickness of the spacer 2 is chosen to be as thin as the order of 50 μm. Furthermore, since the first antenna 21 and the second antenna 22 are disposed at right angles to each other, the read range can be further increased by increasing the width of the second antenna 22.

Second Variation of Wide Tag Antenna

Figure 13:
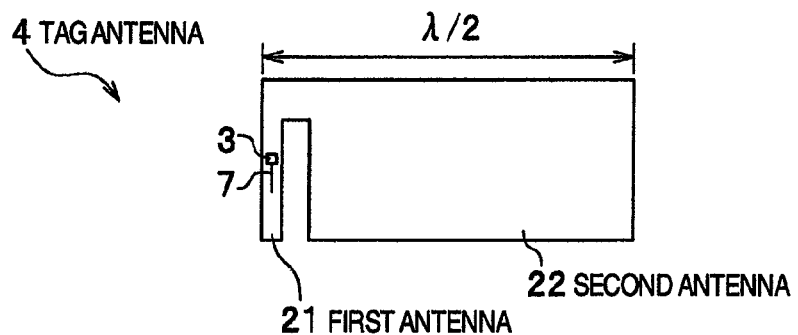
FIG. 13 is a configuration diagram showing a second variation of the wide tag antenna according to the second embodiment of the present invention.

FIG. 13 is a configuration diagram of a second variation of the wide tag antenna according to the second embodiment of the present invention. In this variation, the configuration of the first variation of the second embodiment shown in FIG. 12 is modified so that a portion near the end of the second antenna along a longer side is cut out and the end is turned into the first antenna. That is, the portion near the end along the longer side of the wide second antenna 22 is cut out in a strip to form the first antenna 21 on which the IC chip 3 is mounted as shown in FIG. 13. The first antenna 21 has an electrical length slightly shorter than the width of the second antenna 22 and the wide rectangular second antenna 22 extending from the end of the first antenna 21 in a direction at right angles to the first antenna has an electrical length of approximately $\lambda/2$ or $\lambda/2$ multiplied by n (where n is an integer greater than or equal to 1).

The configuration of the tag antenna 4 as shown in FIG. 13 allows the second antenna 22 to resonate through the first antenna 21 and therefore a relatively long communication distance can be attained even if the electrical length of the first antenna 21 is chosen to be shorter than $\lambda/2$ or the thickness of the spacer 2 is chosen to be as thin as the order of 50 μm. Furthermore, since the width of the second antenna 22 is increased, the characteristic of elliptical polarization can be provided and the read range can be further increased.

Third Variation of Wide Tag Antenna

Figure 14:
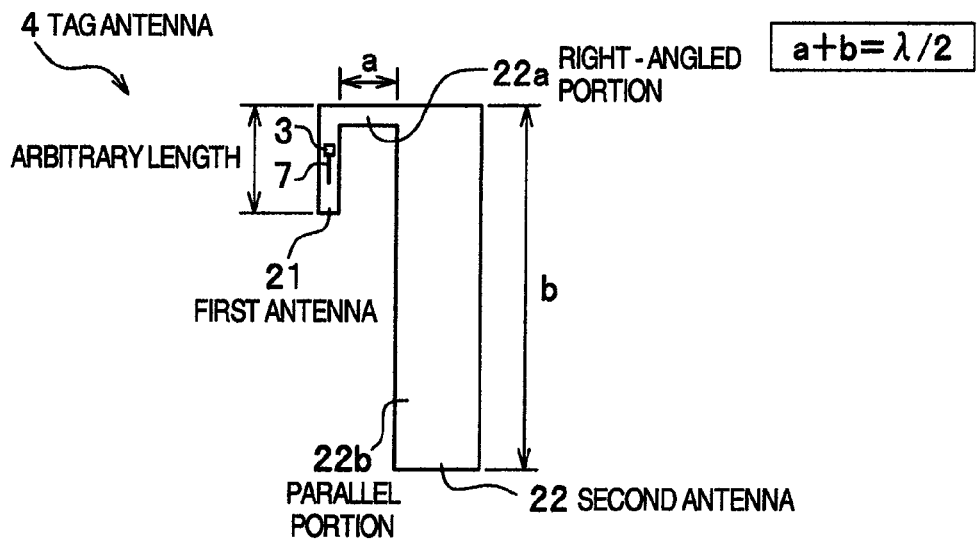
FIG. 14 is a configuration diagram showing a third variation of the wide tag antenna according to the second embodiment of the present invention.

FIG. 14 shows a configuration diagram of a third variation of the wide tag antenna according to the second embodiment. In this variation, the configuration of the third variation of the first embodiment shown in FIG. 7B is modified to increase the width of the parallel portion 12b of the second antenna 12. That is, the total electrical length of a right-angled portion 22a and a parallel portion 22b of the second antenna 22 (that is, the length (a+b)) is $\lambda/2$ or $\lambda/2$ multiplied by n (where n is an integer greater than or equal to 1), but the parallel portion 22b of the second antenna 22 has an arbitrary width and an electrical length "b" of the longer side of the second antenna 22 is longer than the electrical length of the first antenna 11 as shown in FIG. 14.

The shape of the tag antenna 4 as shown in FIG. 14 also allows the second antenna 22 to resonate through the first antenna 21 and therefore a relatively long communication distance can be attained even if the electrical length of the first antenna 21 is chosen to be shorter than $\lambda/2$ or the thickness of the spacer 2 is chosen to be as thin as the order of 50 v.

Furthermore, with this shape of the tag antenna 4, the characteristic of elliptical polarization can be provided and the read range can be increased by extending the width of the parallel portion 22b of the second antenna 22.

Fourth Variation of Wide Tag Antenna

Figure 15:
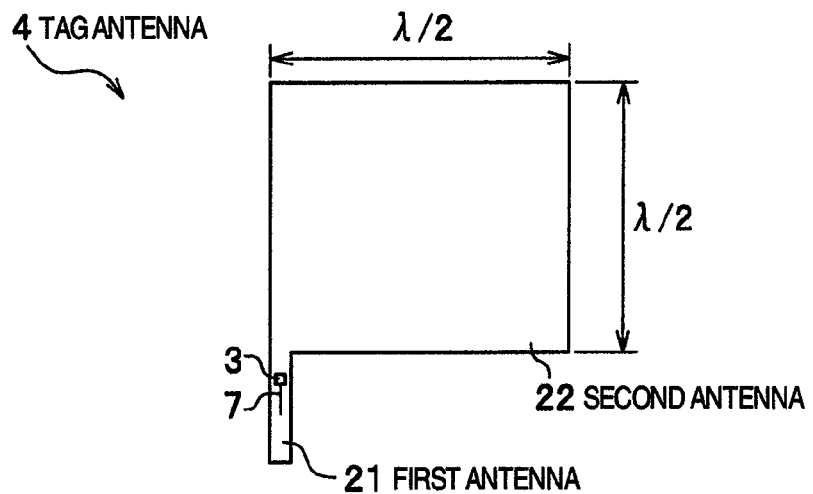
FIG. 15 is a configuration diagram showing a fourth variation of the wide tag antenna according to the second embodiment of the present invention.

FIG. 15 is a configuration diagram of a fourth variation of the wide tag antenna according to the second embodiment. In this variation, the configuration of the first variation of the second embodiment shown in FIG. 12 is modified so that the second antenna 22 has the shape of a square with an electrical length of $\lambda/2$ or $\lambda/2$ multiplied by n (where n is an integer greater than or equal to 1). This shape of the tag antenna 4 also can provide a relatively long communication distance, the characteristic of elliptical polarization, and a wide read range.

Fifth Variation of Wide Tag Antenna

Figure 16:
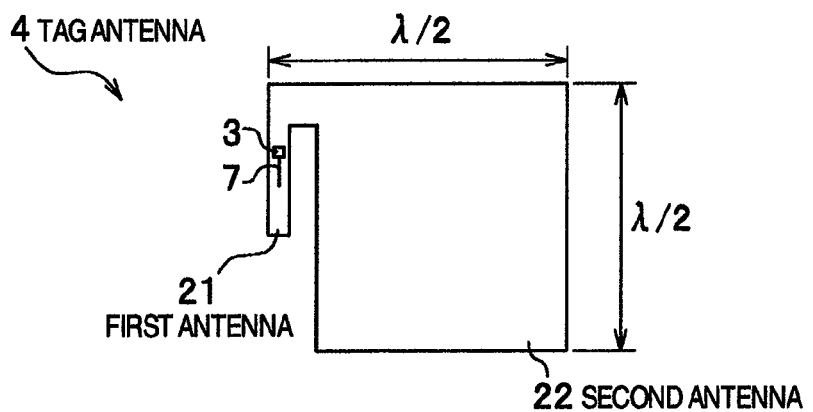
FIG. 16 is a configuration diagram showing a fifth variation of the wide tag antenna according to the second embodiment of the present invention.

FIG. 16 is a configuration diagram of a fifth variation of the wide tag antenna according to the second embodiment. In this variation, the configuration of the second variation of the second embodiment shown in FIG. 13 is modified so that the second antenna 22 has the shape of a square with an electrical length of $\lambda/2$ or $\lambda/2$ multiplied by n (where n is an integer greater than or equal to 1). This shape of the tag antenna also can provide a relatively long communication distance, the characteristic of elliptical polarization, and a wide read range.

Sixth Variation of Wide Tag Antenna

Figure 17:
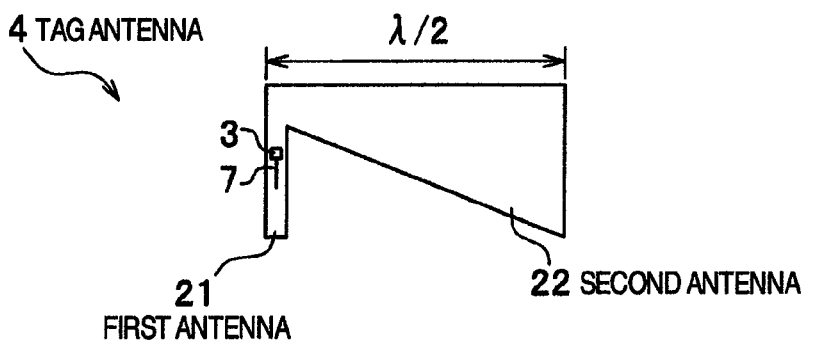
FIG. 17 is a configuration diagram showing a sixth variation of the wide tag antenna according to the second embodiment of the present invention.

FIG. 17 is a configuration diagram of a sixth variation of the wide tag antenna according to the second embodiment. In this variation, the configuration of the first variation of the second embodiment shown in FIG. 12 is modified so that the longer side of the second antenna 22 still has an electrical length of $\lambda/2$ or $\lambda/2$ multiplied by n (where n is an integer greater than or equal to 1) but the width of the second antenna 22 is widened toward the end in the longitudinal direction in the shape of an unfolded fan.

Third Embodiment

In a third embodiment, a detailed description will be given of an embodiment in which a tag antenna is formed on a base film, an embodiment in which a first antenna is electrically coupled with a second antenna, and an embodiment in which an inlet formed by a tag antenna on which an IC chip is mounted is laminated with a protective film to form an RFID tag.

Figure 18:
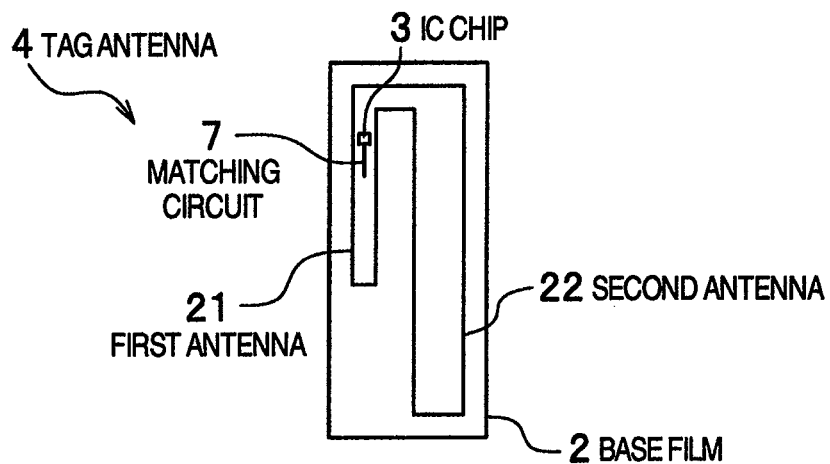
FIG. 18 is a conceptual diagram of an embodiment viewed from above in which a tag antenna is formed on a base film according to a third embodiment of the present invention.

FIG. 18 is a conceptual diagram of one embodiment, viewed from above, in which a tag antenna is formed on a base film according to the third embodiment. First and second antennas 21 and 22 each having a thickness of on the order of several tens of μm are contiguously deposited by metal vapor deposition or formed of a metal foil on a base film 2 made of a heat-resistant polyimide film having a thickness of approximately 30 μm, for example. Then, a slit is formed in a predetermined position on the first antenna 21, a matching circuit 7 is provided, and an IC chip 3 is mounted on it. A tag antenna 4 is thus formed, where the first antenna 21 and the second antenna 22 are interconnected by a conductor connection. The IC chip 3 drives the first antenna and changes in the electric potential at the end of the first antenna causes the second antenna to resonate. That is, the IC chip 3 causes the second antenna to resonate through the first antenna.

Figure 19:
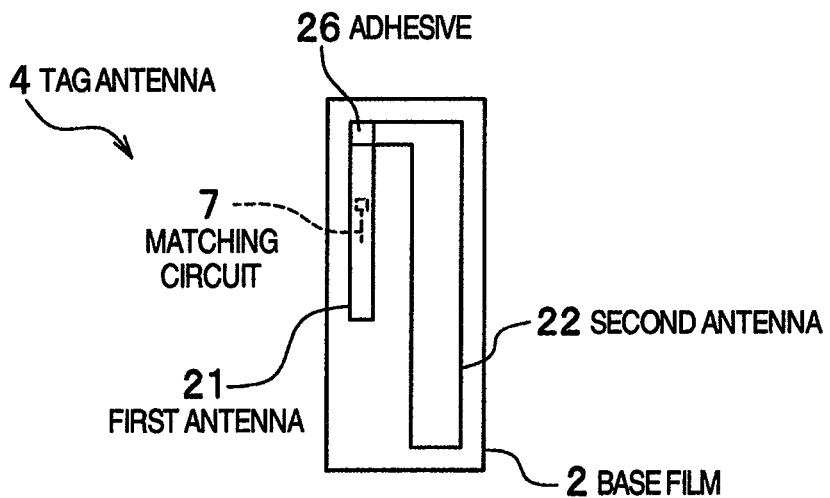
FIG. 19 is a conceptual diagram of another embodiment viewed from above in which a tag antenna is formed on a base film according to the third embodiment of the present invention.

FIG. 19 is a conceptual diagram of another embodiment of the third embodiment, viewed from above, in which a tag antenna is formed on a base film. That is, as shown in FIG. 19, a first antenna 21 is formed of a metal foil, then an adhesive 26 is provided in a portion of the first antenna where a second antenna 22 will overlap, then the second antenna 22 is formed of a metal foil. The adhesive 26 may be an acrylic material or a heat-resistant silicone material and may be applied to the entire surface of the second antenna. By layering the first antenna 21, the adhesive 26, and the second antenna 22 in this way, the first antenna 21 is electrostatically coupled with the second antenna 22. In the case of electrostatic coupling, changes in the electric potential at the end of the first antenna 21 indirectly cause the second antenna to resonate. When such a layered structure is employed, it is desirable that the first and second antennas 21 and 22 be made of a metal foil. The reason why the resin film 26 is made of a heat-resistant material in the configuration in FIG. 19 is to improve the durability of the RFID tag 4 to withstand the temperature (for example approximately 150 degrees Celsius) at which the RFID tag 4 is laminated with the outer film or a high temperature condition under which the RFID tag 4 is used.

Figure 20:
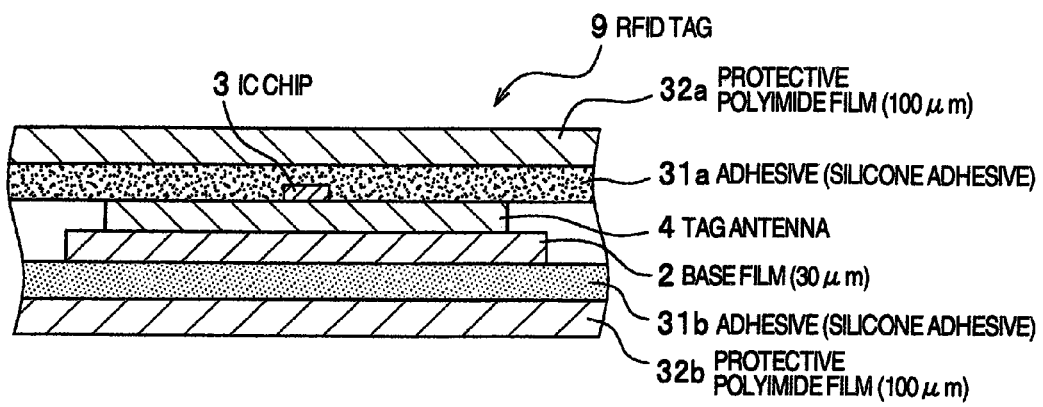
FIG. 20 is a cross-sectional view of an embodiment in which an inlet is laminated with outer films to form a heat-resistant RFID tag according to the third embodiment of the present invention.

FIG. 20 is a cross-sectional view of an embodiment according to the third embodiment in which an inlet is laminated with outer films to form a heat resistant RFID tag. As shown in FIG. 20, a tag antenna 4 on which an IC chip 3 is mounted is placed on a base film 2 made of a polyimide film having a thickness of 30 µm to form an inlet, which is not labeled with a reference numeral in FIG. 20. Both sides of the inlet are laminated with 100-µm-thick heat-resistant protective polyimide films 32a, 32b the inner surface of each of which is coated with a silicone adhesive 31a, 31b. By covering the inlet with the protective polyimide films 32a, 32b in this way, a heat-resistant RFID tag 9 is formed.

The outer surface (back-side surface) of the protective polyimide film 32b may be coated with an adhesive made of a heat-resistant material such as silicone for attaching the RFID tag 9 to a metal material (not shown). Since heat resistance is provided by this configuration, the RFID tag 9 can be attached to a metal item heated, such as a resin molding metal mold, for managing a process for resin molding and a resin molded product.

Figure 21:
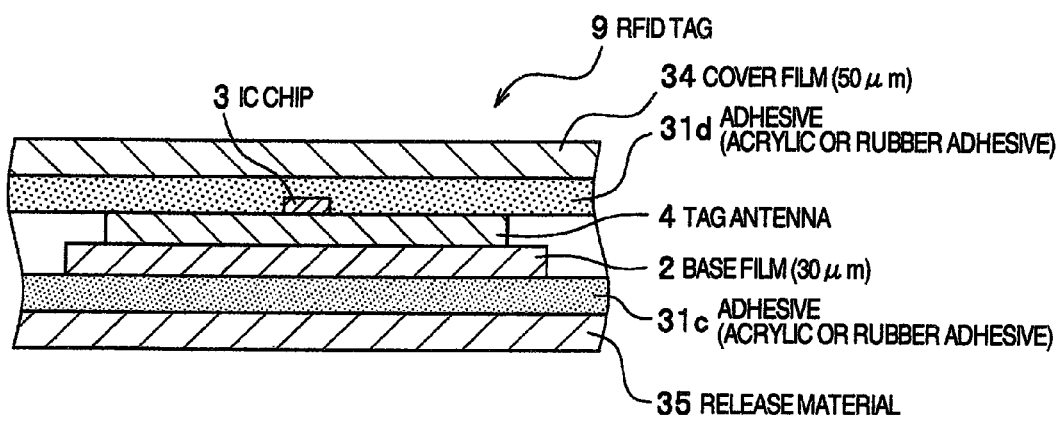
FIG. 21 is a cross-sectional view of an embodiment in which an inlet is laminated with an outer film to form an RFID tag for use at room temperature according to the third embodiment of the present invention.

FIG. 21 is a cross-sectional view of an embodiment according to the third embodiment in which an inlet is laminated with an outer film to form an RFID tag to be used at room temperature. As shown in FIG. 21, a tag antenna 4 including an IC chip 3 mounted thereon is placed on a 30-µm-thick base film 2 made of a polyimide film to form an inlet and the surface of the inlet is covered with a 50-µm-thick cover film 34 made of a resin film of PP (polypropylene) or PET (polyethylene terephthalate). The inner surface of the cover film 34 is coated with an adhesive 31d made of an acrylic or rubber material. The back-side surface of the base film 2 is coated with an adhesive 31c made of an acrylic or rubber material and a release paper 35 is attached to the back-side surface of the adhesive 31c. Thus, an RFID tag 9 to be used at room temperature is formed and can be directly adhered to the surface of a metal material used at room temperature after removing the release paper 35.

EXPERIMENTAL RESULTS

Results of experiments on the communication distances of RFID tags using the tag antennas implemented according to the embodiments described above will be described below. Here, results of experiments on the communication distances of RFID tags using a tag antenna including first and second antennas disposed in right angles to each other as described in the first variation of the first embodiment with reference to FIG. 3 will be described. The experimental data given below are data on communication distances measured when the RFID tags were attached on a 50-µm-thick polyimide film placed on a metal material. The frequency of the radio wave used is 2.45 GHz.

Figure 22:
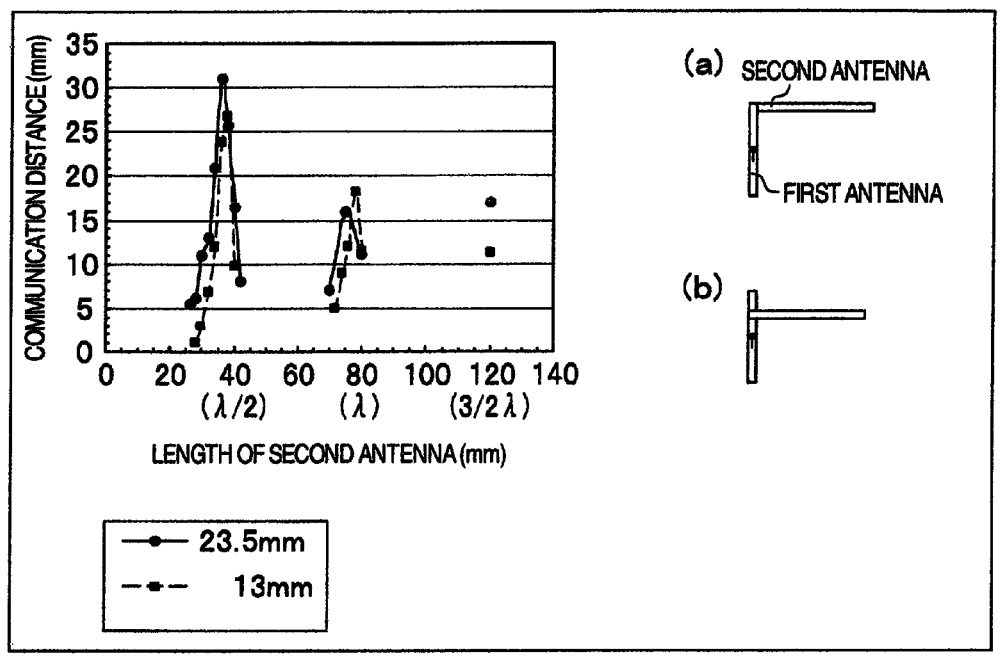
FIG. 22 is a characteristic graph showing the relationship between a communication distance and the length of a second antenna disposed at right angles to a first antenna having a fixed length, with varying attachment positions of the first antenna, and a diagram showing the shape of the tag antenna.

FIG. 22 is a characteristic graph showing the relationship between a communication distance and the length of a second antenna disposed at right angles to a first antenna having a fixed length, with varying attachment positions of the first antenna, and a diagram showing a shape of the tag antenna. The horizontal axis of the characteristic graph in FIG. 22 represents the length (mm) of the second antenna and the vertical axis represents the communication distance (mm). Parameters of the tag antenna are shown (a) in a case where the second antenna is attached to a position on the first antenna at a distance of 23.5 mm from the center of the first antenna (that is, the attaching position is at the end of the first antenna) at right angles to the first antenna and (b) in a case where the second antenna is attached to a position on the first antenna at a distance of 13 mm from the center of the first antenna at right angles to the first antenna.

In both of the first and second antenna attachment configurations (a) and (b), the maximum communication distance of approximately 30 mm appears when the length of the second antenna is $\lambda/2$ (40 mm) and somewhat great communication distances appear when the length of the second antenna is $\lambda$ (80 mm) and $(3/2)\lambda$ (120 mm). That is, it can be seen from FIG. 22 that long communication distances can be obtained when the length of the second antenna is $\lambda/2$ or an integral multiple of $\lambda/2$ and the maximum communication distance can be obtained especially when the length of the second antenna is $\lambda/2$, even if the length of the first antenna is varied arbitrarily.

Figure 23:
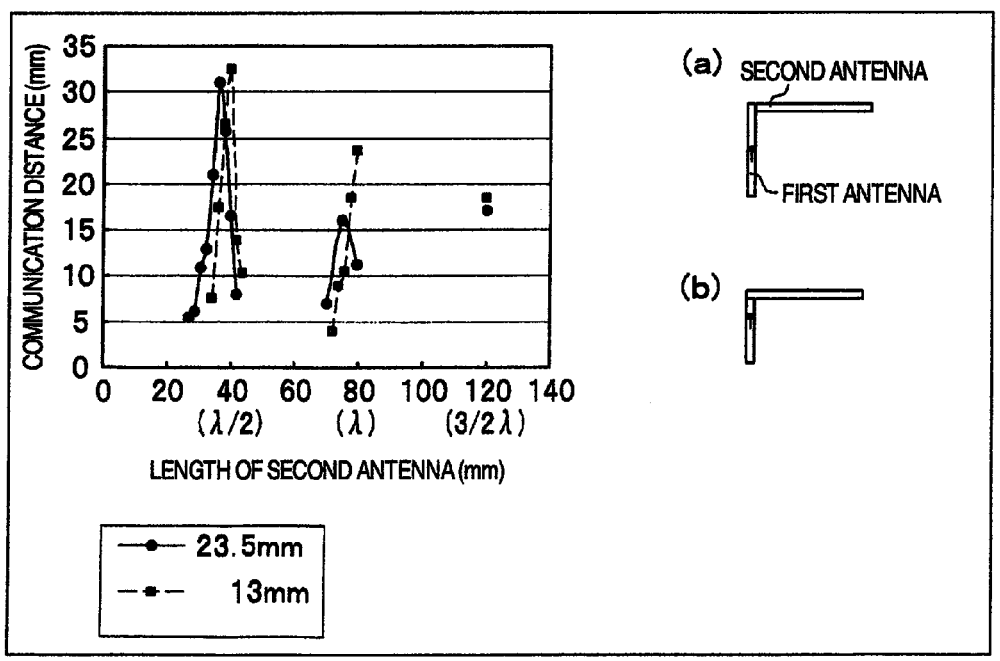
FIG. 23 is a characteristic graph showing the relationship between a communication distance and the length of a second antenna disposed at right angles to a first antenna, with varying lengths of the first antenna, and a diagram showing the shape of the tag antenna.

In order to substantiate the characteristic results shown in FIG. 22, results of measurement of communication distances using a practical tag antenna shape will be described. FIG. 23 is a characteristic graph showing the relationship between the length of a second antenna and a communication distance when the second antenna is positioned at right angles to a first antenna and the length of the first antenna is varied. The horizontal axis of the characteristic graph in FIG. 23 represents the length (mm) of the second antenna and the vertical axis represents a communication distance (mm). Parameters of the tag antenna are shown (a) in a case where the length of the first antenna is 23.5 mm from the center of the antenna and the second antenna is attached at right angles to the first antenna and (b) in a case where the length of the first antenna from the center of the antenna is 13 mm and the second antenna is attached at right angles to the first antenna.

For both of the tag antenna configurations (a) and (b), the maximum communication distance of approximately 30 mm appears when the length of the second antenna is $\lambda/2$ (40 mm) and somewhat great communication distances appear when the length of the second antenna is $\lambda$ (80 mm) and $(3/2)\lambda$ (120 mm). That is, as can be seen from FIG. 23, long communication distances can be obtained when the length of the second antenna is $\lambda/2$ or an integral multiple of $\lambda/2$ and the maximum communication distance can be obtained especially when the length of the second antenna is $\lambda/2$, even if the length of the first antenna is varied arbitrarily.

Figure 24:
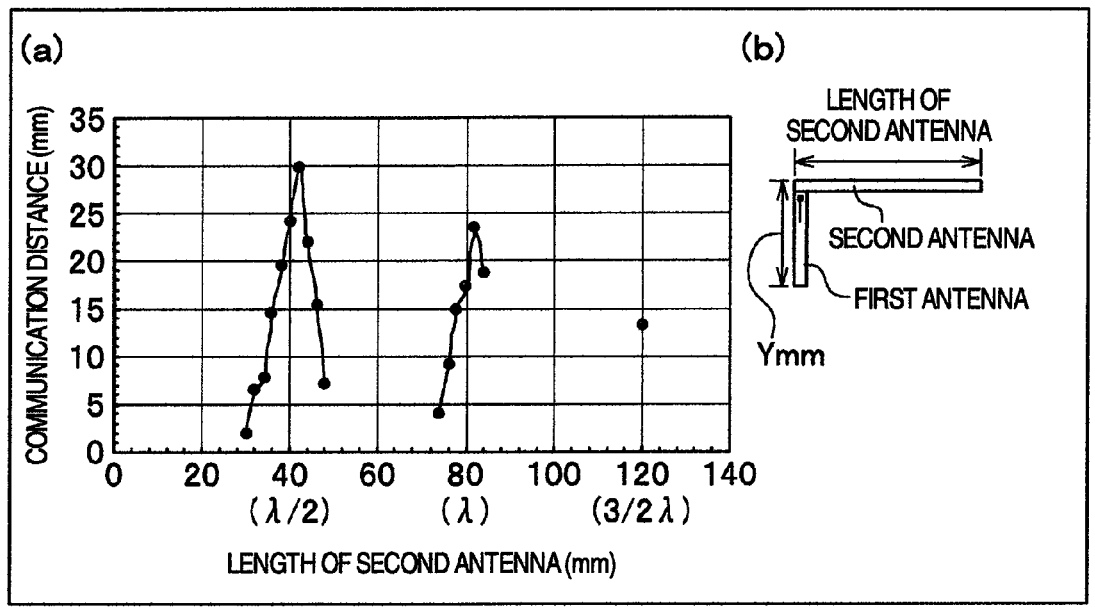
FIG. 24 is a characteristic graph showing the relationship between a communication distance and the length of a second antenna disposed at right angles to a first antenna with a length of 4 mm and a diagram showing the shape of the tag antenna.

FIG. 24 shows a characteristic graph showing the relationship between the length of a second antenna and a communication distance when the length of a first antenna is 4 mm from the center of the antenna and the second antenna is disposed at right angles to the first antenna, and showing a shape of the tag antenna. The horizontal axis represents the length (mm) of the second antenna and the vertical axis represents a communication distance (mm). That is, the characteristic graph shows the relationship between the length of the second antenna and the communication distance in a case where the length of the first antenna is 4 mm from the center of the antenna, which is the minimum size in which a matching circuit can be formed and an IC chip can be mounted on the first antenna. As can be seen from FIG. 24, the maximum communication distance of approximately 30 mm appears when the length of the first antenna is 4 mm from the center of the antenna and the length of the second antenna is $\lambda/2$ (40 mm), and a communication distance of approximately 24 mm appears when the length of the second antenna is $\lambda$ (80 mm).

Figure 25:
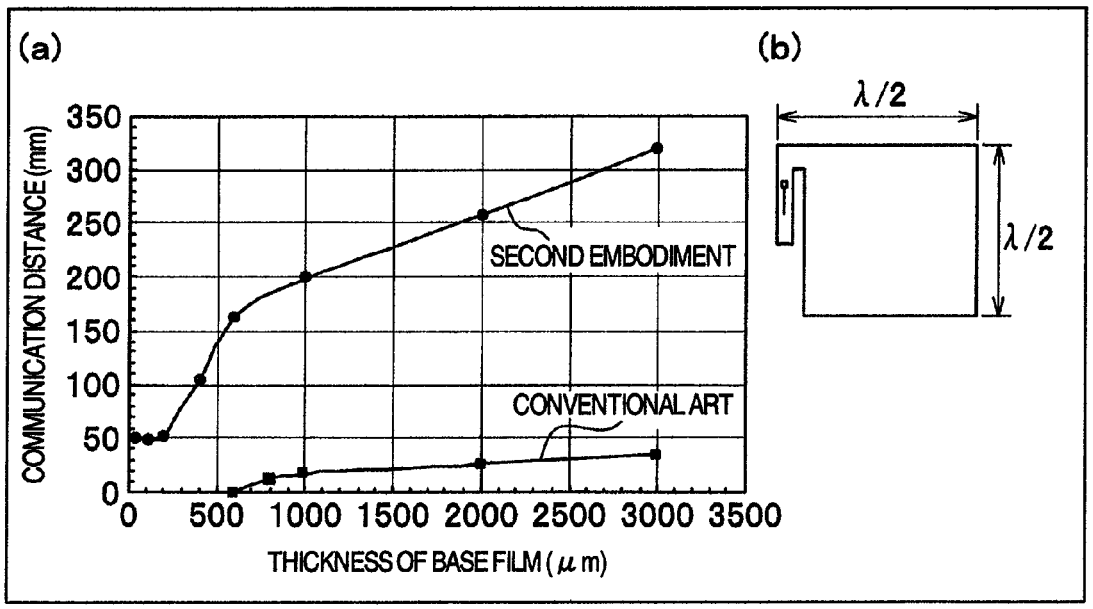
FIG. 25 is a characteristic graph showing a comparison between the communication distance of a tag antenna according to conventional art and that of the tag antenna according to the second embodiment, and a diagram showing the shape of the tag antenna according to the second embodiment.

FIG. 25 shows a characteristic graph showing a comparison between the communication distance of a tag antenna according to the conventional art and that of the tag antenna according to the second embodiment, and showing the shape of the tag antenna according to the second embodiment. The horizontal axis of the characteristic graph represents the thickness ($\mu$m) of a base film and the vertical axis represents a communication distance (mm). That is, the characteristic graph of FIG. 25 shows changes in communication distance with varying thickness of the base film placed on a surface of a metal material in a case where a conventional tag antenna is used and a case where the tag antenna according to the second embodiment is used. The tag antenna used in the measurement in FIG. 25 has the shape of the fifth variation of the second embodiment shown in FIG. 16. The conventional tag antenna here is a dipole antenna having an electrical length of $\lambda/2$ as shown in FIG. 2.

As shown in FIG. 25, in the case of the conventional tag antenna that is a $\lambda/2$ dipole antenna, no radio waves are transmitted when the thickness of the base film is less than or equal to 600 $\mu$m, and the communication distance achieved when the thickness of the base film is 1000 $\mu$m (1 mm) is as little as approximately 15 mm. In contrast, in the case of the tag antenna having the shape as shown in the right-hand part of the FIG. 25, a communication distance of 50 mm can be obtained even with a base film having a thickness of approximately 50 $\mu$m, and the communication distance increases as the thickness of the base film is increased. For example, when the thickness of the base film is 1000 $\mu$m (1 mm), a communication distance of 200 mm can be obtained.

A communication distance of approximately 50 mm can also be obtained when a 10-$\mu$m-thick adhesive and 40-$\mu$m-thick resin film are used in stead of a 50-$\mu$m-thick base film. Considering that a commonly used plastic bag typically has a thickness of 50 $\mu$m and a plastic shopping bag of a supermarket typically has a thickness of 20 $\mu$l, the RFID tag using the tag antenna of the present embodiment can operate at a normal communication distance even when such a very thin resin film is located between the RFID tag and a metal material.

The communication distance of the tag antenna of the embodiment described above in free space is 220 mm. Therefore, by choosing the thickness of the base film to be approximately 1000 $\mu$m (1 mm), a communication distance of approximately 200 mm can be obtained regardless of whether an object to which the RFID tag is to be attached is a metal or nonmetal. Consequently, the convenience of the RFID tag is significantly improved in terms of attachment. In the case of the conventional technique that places an insulator between the tag antenna of an RFID tag and a metal, an off-the-shelf reader/writer cannot read data of the RFID tag if the thickness of the insulator is less than 600 $\mu$m (0.6 mm). Even if the thickness of the insulator is increased up to approximately 3 mm (3000 $\mu$m), the communication distance that can be obtained with the conventional technique is no more than approximately 34 mm. In contrast, the tag antenna according to any of the embodiments described above is capable of providing a communication distance of approximately 320 mm when the insulator is approximately 3 mm thick.

The RFID tag can be effectively used as an RFID tag for managing information concerning the production process and logistics of metal products.

It should be further understood by those skilled in the art that although the foregoing description has been made of embodiments of the invention, the invention is not limited thereto and various changes and modifications may be made without departing from the spirit of the invention and the scope of the appended claims.

The invention claimed is:

1. An RFID tag transmitting information recorded on an IC chip by radio, comprising:
   a first antenna including the IC chip mounted thereon in a central part in a longitudinal direction;
   a second antenna connected to one end of the first antenna; and
   a base film having a predetermined dielectric constant and connected to the first antenna and the second antenna;
   wherein the second antenna includes a first portion having a first end connected to the first antenna at an angle of 90 degrees, and a second portion connected to a second end of the first portion at an angle of 90 degrees,
   wherein the first antenna and the second portion extend in the same direction with respect to the first portion and oppose each other,
   wherein a total length of the first portion and the second portion is an integral multiple of $\lambda/2$, where $\lambda$ corresponds to a reduced wavelength due to an effect caused by the predetermined dielectric constant, and
   wherein the first antenna is shorter than the total length of the first portion and the second portion and the first antenna is longer than the second portion.

2. The RFID tag according to claim 1, wherein the second antenna resonates through the first antenna.

3. The RFID tag according to claim 1, wherein the first antenna has an arbitrary electrical length shorter than that of the second antenna.

4. The RFID tag according to claim 1, wherein the second antenna has a dimension less than or equal to $\lambda/2$ in a width direction.

5. The RFID tag according to claim 1, wherein a back side of the RFID tag is attached to a metal surface; and
   a spacer made of an insulator is disposed on the back side of the first antenna and the second antenna.

6. The RFID tag according to claim 5, wherein the spacer is made of any of a resin, a resin foam, paper, and glass.

7. The RFID tag according to claim 1, wherein
   the first antenna comprises a matching circuit performing impedance matching with an output of the IC chip; and
   the matching circuit is implemented by a slit formed in the first antenna and a stub, formed by the slit.

8. The RFID tag according to claim 7, wherein
   the slit is L-shaped or T-shaped; and
   the IC chip is mounted on the first antenna in such a manner that terminals are separated from each other by the slit.

9. The RFID tag according to claim 1, wherein the first antenna and the second antenna are electrically interconnected at an arbitrary angle of less than or equal to 90 degrees with respect to each other.

10. The RFID tag according to claim 1, wherein the first antenna and the second antenna are electrically interconnected at an angle of approximately 90 degrees with respect to each other.

11. The RFID tag according to claim 9, wherein the first antenna and the second antenna are interconnected by a conductor connection.

12. The RFID tag according to claim 9, wherein the first antenna and the second antenna are electrostatically coupled with each other by a layered structure with a dielectric film being inserted between the first antenna and the second antenna.

13. The RFID tag according to claim 9, wherein the first antenna and the second antenna are electrically interconnected by electrostatic coupling through an adhesive.

14. The RFID tag according to claim 1, wherein the first antenna, the first portion, and the second portion are each linear.

15. An RFID tag transmitting information recorded on an IC chip by radio, comprising:
   a first antenna including the IC chip mounted thereon; and
   a second antenna connected to a first end of the first antenna;
   wherein the second antenna has an electrical length of an integral multiple of $\lambda/2$ in a longitudinal direction, where $\mu$ is a wavelength of a radio wave emitted from the first antenna,
   wherein a second end of the first antenna is not connected to any other antenna,
   wherein the first antenna has an electrical length less than $\lambda/2$, and
   wherein the IC chip is mounted towards the first end of the first antenna with respect to a center part of the first antenna.

* * * * *